US007689469B1

(12) United States Patent
Mesaros

(10) Patent No.: US 7,689,469 B1
(45) Date of Patent: *Mar. 30, 2010

(54) E-COMMERCE VOLUME PRICING

(75) Inventor: Gregory J. Mesaros, Westlake, OH (US)

(73) Assignee: eWinWin, Inc., Tampa, FL (US)

( * ) Notice: Subject to any disclaimer, the term of this patent is extended or adjusted under 35 U.S.C. 154(b) by 127 days.

This patent is subject to a terminal disclaimer.

(21) Appl. No.: 11/464,376

(22) Filed: Aug. 14, 2006

Related U.S. Application Data

(63) Continuation of application No. 10/370,237, filed on Feb. 20, 2003, now Pat. No. 7,124,099, which is a continuation of application No. 09/324,391, filed on Jun. 3, 1999, now abandoned.

(60) Provisional application No. 60/133,769, filed on May 12, 1999.

(51) Int. Cl.
*G06Q 30/00* (2006.01)
(52) U.S. Cl. ........................................................ 705/26
(58) Field of Classification Search ................. 705/26, 705/27
See application file for complete search history.

(56) References Cited

U.S. PATENT DOCUMENTS

| 4,799,156 | A | 1/1989 | Shavit et al. |
| 4,887,207 | A | 12/1989 | Natarajan |
| 4,947,028 | A | 8/1990 | Gorog |
| 4,992,940 | A | 2/1991 | Dworkin |
| 5,053,957 | A | 10/1991 | Suzuki |
| 5,063,506 | A | 11/1991 | Brockwell et al. |
| 5,402,336 | A | 3/1995 | Spiegelhoff et al. |
| 5,414,838 | A | 5/1995 | Kolton et al. |
| 5,444,630 | A | 8/1995 | Dlugos |
| 5,564,115 | A | 10/1996 | Clarkson |
| 5,592,375 | A | 1/1997 | Salmon et al. |

(Continued)

FOREIGN PATENT DOCUMENTS

WO 9821713 A2 5/1998

(Continued)

OTHER PUBLICATIONS

Gurley, William, "Creating a great E-commerce business", Fortune, Dated Mar. 16, 1998.*

(Continued)

*Primary Examiner*—Mark Fadok
(74) *Attorney, Agent, or Firm*—Turocy & Watson, LLP

(57) ABSTRACT

In the volume pricing methodology, a seller initially establishes a price structure for a product which provides for lower prices as larger quantities of the product are purchased. The price structure is electronically made available to potential buyers of the product. For example, the price structure may be displayed on an Internet site. The sellers further establish an "open session" period during which orders for the product are accepted. During the open session period, multiple buyers are able to place orders for the product up to a maximum available quantity. At the end of the open session, the total quantity of products collectively ordered by all of the buyers is calculated. Based on the total quantity ordered, the final price to all buyers is the lowest price provided from the price structure regardless of whether the lowest price had been reached at the time a particular buyer placed their order during the open session.

20 Claims, 16 Drawing Sheets

U.S. PATENT DOCUMENTS

| | | | |
|---|---|---|---|
| 5,615,109 A | 3/1997 | Eder | |
| 5,623,660 A | 4/1997 | Josephson | |
| 5,664,115 A * | 9/1997 | Fraser | 705/37 |
| 5,689,652 A | 11/1997 | Lupien et al. | |
| 5,710,887 A | 1/1998 | Chelliah et al. | |
| 5,717,989 A * | 2/1998 | Tozzoli et al. | 705/37 |
| 5,732,400 A | 3/1998 | Mandler et al. | |
| 5,734,890 A | 3/1998 | Case et al. | |
| 5,794,207 A * | 8/1998 | Walker et al. | 705/1 |
| 5,822,736 A | 10/1998 | Hartman et al. | |
| 5,826,244 A | 10/1998 | Huberman | |
| 5,837,071 A | 11/1998 | Andersson et al. | |
| 5,842,178 A | 11/1998 | Giovannoli | |
| 5,850,442 A | 12/1998 | Muftic | |
| 5,870,721 A | 2/1999 | Norris | |
| 5,878,400 A | 3/1999 | Carter, III | |
| 5,890,138 A * | 3/1999 | Godin et al. | 705/26 |
| 5,897,620 A | 4/1999 | Walker et al. | |
| 5,903,830 A | 5/1999 | Joao et al. | |
| 5,933,817 A | 8/1999 | Hucal | |
| 5,945,653 A | 8/1999 | Walker et al. | |
| 5,970,478 A | 10/1999 | Walker et al. | |
| 5,974,406 A | 10/1999 | Bisdikian et al. | |
| 5,987,434 A | 11/1999 | Libman | |
| 5,995,943 A | 11/1999 | Bull et al. | |
| 6,016,484 A | 1/2000 | Williams et al. | |
| 6,026,383 A | 2/2000 | Ausubel | |
| 6,052,670 A | 4/2000 | Johnson | |
| 6,055,519 A | 4/2000 | Kennedy et al. | |
| 6,064,981 A | 5/2000 | Barni et al. | |
| 6,078,906 A | 6/2000 | Huberman | |
| 6,101,484 A | 8/2000 | Halbert et al. | |
| 6,108,639 A | 8/2000 | Walker et al. | |
| 6,112,189 A | 8/2000 | Rickard et al. | |
| 6,131,087 A * | 10/2000 | Luke et al. | 705/26 |
| 6,141,653 A | 10/2000 | Conklin et al. | |
| 6,151,588 A * | 11/2000 | Tozzoli et al. | 705/37 |
| 6,154,738 A | 11/2000 | Call | |
| 6,167,383 A | 12/2000 | Henson | |
| 6,195,646 B1 | 2/2001 | Grosh et al. | |
| 6,219,653 B1 | 4/2001 | O'Neill et al. | |
| 6,236,972 B1 * | 5/2001 | Shkedy | 705/37 |
| 6,260,019 B1 * | 7/2001 | Courts | 705/1 |
| 6,260,024 B1 | 7/2001 | Shkedy | |
| 6,266,651 B1 * | 7/2001 | Woolston | 705/27 |
| 6,269,343 B1 * | 7/2001 | Pallakoff | 705/26 |
| 6,289,348 B1 | 9/2001 | Richard et al. | |
| 6,323,894 B1 * | 11/2001 | Katz | 348/14.08 |
| 6,332,135 B1 | 12/2001 | Conklin et al. | |
| 6,336,105 B1 | 1/2002 | Conklin et al. | |
| 6,338,050 B1 | 1/2002 | Conklin et al. | |
| 6,360,205 B1 | 3/2002 | Iyengar et al. | |
| 6,397,208 B1 | 5/2002 | Lee | |
| 6,415,270 B1 | 7/2002 | Rackson et al. | |
| 6,418,415 B1 * | 7/2002 | Walker et al. | 705/26 |
| 6,418,441 B1 | 7/2002 | Call | |
| 6,449,601 B1 * | 9/2002 | Friedland et al. | 705/37 |
| 6,456,986 B1 | 9/2002 | Boardman et al. | |
| 6,496,568 B1 | 12/2002 | Nelson | |
| 6,507,279 B2 | 1/2003 | Loof | |
| 6,519,571 B1 | 2/2003 | Guheen et al. | |
| 6,553,346 B1 * | 4/2003 | Walker et al. | 705/1 |
| 6,578,014 B1 | 6/2003 | Murcko, Jr. | |
| 6,584,451 B1 | 6/2003 | Shoham et al. | |
| 6,604,089 B1 | 8/2003 | Van Horn et al. | |
| 6,606,607 B1 | 8/2003 | Martin et al. | |
| 6,631,356 B1 | 10/2003 | Van Horn et al. | |
| 6,647,373 B1 | 11/2003 | Carlton-Foss | |
| 6,658,093 B1 | 12/2003 | Langseth et al. | |
| 6,662,194 B1 | 12/2003 | Joao et al. | |
| 6,782,370 B1 | 8/2004 | Stack | |
| 6,785,661 B1 | 8/2004 | Mandler et al. | |
| 6,847,938 B1 | 1/2005 | Moore | |
| 6,850,907 B2 | 2/2005 | Lutnick et al. | |
| 6,868,392 B1 | 3/2005 | Ogasawara | |
| 6,871,140 B1 | 3/2005 | Florance et al. | |
| 6,871,190 B1 | 3/2005 | Seymour et al. | |
| 6,876,977 B1 | 4/2005 | Marks | |
| 6,877,655 B1 | 4/2005 | Robertson et al. | |
| 6,877,665 B2 | 4/2005 | Challa et al. | |
| 6,915,275 B2 | 7/2005 | Banerjee et al. | |
| 6,925,446 B2 | 8/2005 | Watanabe | |
| 6,954,734 B1 | 10/2005 | Kuelbs et al. | |
| 6,990,467 B1 | 1/2006 | Kwan | |
| 6,992,794 B2 | 1/2006 | Keane et al. | |
| 7,047,206 B1 | 5/2006 | Schultze | |
| 7,069,228 B1 * | 6/2006 | Rose et al. | 705/5 |
| 7,076,447 B1 | 7/2006 | Peyser et al. | |
| 7,080,030 B2 | 7/2006 | Eglen et al. | |
| 7,103,565 B1 | 9/2006 | Vaid | |
| 7,107,226 B1 * | 9/2006 | Cassidy et al. | 705/26 |
| 7,120,592 B1 | 10/2006 | Lewis | |
| 7,124,099 B2 | 10/2006 | Mesaros | |
| 7,124,107 B1 | 10/2006 | Pishevar et al. | |
| 7,133,835 B1 * | 11/2006 | Fusz et al. | 705/1 |
| 7,165,045 B1 | 1/2007 | Kim-E | |
| 7,181,419 B1 | 2/2007 | Mesaros | |
| 7,194,427 B1 | 3/2007 | Van Horn et al. | |
| 7,194,442 B1 | 3/2007 | Flanagan et al. | |
| 7,213,754 B2 | 5/2007 | Eglen et al. | |
| 7,296,001 B1 | 11/2007 | Ephrati et al. | |
| 7,363,246 B1 | 4/2008 | Van Horn et al. | |
| 7,364,086 B2 | 4/2008 | Mesaros | |
| 2001/0011264 A1 | 8/2001 | Kawasaki | |
| 2001/0014868 A1 | 8/2001 | Herz et al. | |
| 2001/0018660 A1 * | 8/2001 | Sehr | 705/5 |
| 2001/0047296 A1 | 11/2001 | Wyker | |
| 2001/0047311 A1 | 11/2001 | Singh | |
| 2002/0026351 A1 | 2/2002 | Coleman | |
| 2002/0032573 A1 | 3/2002 | Williams et al. | |
| 2002/0035536 A1 | 3/2002 | Gellman | |
| 2002/0046147 A1 | 4/2002 | Livesay et al. | |
| 2002/0065762 A1 | 5/2002 | Lee et al. | |
| 2002/0069079 A1 | 6/2002 | Vega | |
| 2002/0080950 A1 | 6/2002 | Koko et al. | |
| 2002/0091580 A1 | 7/2002 | Wang | |
| 2002/0099643 A1 | 7/2002 | Abeshouse et al. | |
| 2002/0107773 A1 | 8/2002 | Abdou | |
| 2002/0116282 A1 | 8/2002 | Martin et al. | |
| 2002/0143692 A1 | 10/2002 | Heimermann et al. | |
| 2002/0147670 A1 | 10/2002 | Lange | |
| 2002/0165771 A1 | 11/2002 | Walker et al. | |
| 2002/0165821 A1 | 11/2002 | Tree | |
| 2002/0169703 A1 | 11/2002 | Lutnick et al. | |
| 2003/0028473 A1 | 2/2003 | Eso et al. | |
| 2003/0041002 A1 | 2/2003 | Hao et al. | |
| 2003/0055774 A1 | 3/2003 | Ginsberg | |
| 2003/0109949 A1 | 6/2003 | Ikeda | |
| 2003/0111531 A1 | 6/2003 | Williams et al. | |
| 2003/0126040 A1 | 7/2003 | Mesaros | |
| 2003/0149619 A1 | 8/2003 | Stanley et al. | |
| 2003/0167222 A1 | 9/2003 | Mehrotra et al. | |
| 2003/0195832 A1 | 10/2003 | Cao et al. | |
| 2003/0208412 A1 | 11/2003 | Hillestad et al. | |
| 2003/0233276 A1 | 12/2003 | Pearlman et al. | |
| 2003/0233557 A1 | 12/2003 | Zimmerman | |
| 2004/0015415 A1 | 1/2004 | Cofino et al. | |
| 2004/0039677 A1 | 2/2004 | Mura et al. | |
| 2004/0215500 A1 | 10/2004 | Monahan | |
| 2005/0038713 A1 | 2/2005 | Pickard et al. | |
| 2006/0095366 A1 | 5/2006 | Sheth et al. | |
| 2006/0129454 A1 | 6/2006 | Moon et al. | |

| | | | |
|---|---|---|---|
| 2006/0178918 | A1 | 8/2006 | Mikurak |
| 2008/0015711 | A1 | 1/2008 | Charland et al. |

FOREIGN PATENT DOCUMENTS

| | | |
|---|---|---|
| WO | WO 00/50970 | 8/2000 |

OTHER PUBLICATIONS

Accompany: How it Works: "Anatomy of a Buy-Cycle", Jun. 15, 1999, pp. 1-3.
Amazon.com, "Help/Shipping", Archived on Feb 2, 2003 by www.archive.org. Last accessed Mar. 19, 2008, 9 pages.
Ashton Technology Group, Inc. Announces NASDAQ National Market System Listing; Enters into Clearing Arrangements with 8 National Brokerage Firms, Business Wire, Jan. 3, 2000. http://www.findarticles.com/p/articles/ mi_m0EIN/is_2000_Jan_3/ai_58429780/print. Last accessed Apr. 8, 2009, 3 pages.
Blyth, et al. Merchandising System Collecting Data. Derwent Information Ltd. Last accessed Jan. 20, 2009, 2 pages.
Breyer. "Bargains in Cyberspace," National Home Center News, vol. 26, No. 21, p. 21, Nov. 20, 2000.
Business Editors. "Weatherchem Announces Major eCommerce Success with eWinWin", Aug. 9, 2001, Business Wire, (p. 1) 2 pages.
Business Editors and High Tech Writers, "eWinWin Announces the Release of DAS 3.0, the Next Generation of B2B Demand Aggregation Solutions" Dec. 28, 2000, Businee wire, p. 1 (4 pages).
CBOT, "Trading in Futures Can Provide Considerable Financial Rewards", Last accessed Mar. 19, 2008, 41 pages.
Chicago Board of Trade, "Knowledge Center," as archived by Archive.org, on Feb. 13, 2003.
Computer Geeks Discount Outlet, "Order Status," Mar. 1, 2002.
Deierlein. "Smart Fuel Buying," Fleet Equipment, vol. 24, No. 8, pp. 42-44, Aug. 1998.
Edwards. "Increase Your Bottom Line : Automated Customer Service and Marketing," E-Business Advisor, vol. 17, No. 7, p. 30, Jul. 1999.
ENOS. Vying to be the Top Dog. Upside vol. 12, No. 3, pp. 160-165, Mar. 2000.
eWinWin, "eCommerce Redefined : The Positive Impact of eWinWin's Demand Aggregation System on the Manufacturing Supply Chain", Oct. 2000. Last accessed Mar. 19, 2008, 11 pages.
"Excite@Home Standardizes on Siebel eBusiness; Leading Broadband Media Company Relies on Siebel Systems to Manage Customer Relationships Across Its Entire Family of Services," Business Wire, Jan. 19, 2000.
Gaonkar, et al. Strategic Sourcing and Collaborative Planning in Internet Enabled Supply Chain Networks Producing Multigeneration Products. IEEE Transactions on Automation Science and Engineering, vol. 2, issue 1, Jan. 2005, pp. 54-66.
"Global Real Estate Markets Spell Opportunity, Experts Tell Realtors," PR Newswire, Nov. 21, 1991.
Gurley. Creating a Great E-Commerce Business. Fortune, March 16, 1998.
OA Dated Oct. 20, 2008 for U.S. Appl. No. 10/464,585, 11 pages.
OA Dated Feb. 6, 2009 for U.S. Appl. No. 09/626,296, 11 pages.
OA Dated Nov. 3, 2008 for U.S. Appl. No. 11/150,920, 161 pages.
OA Dated Oct. 29, 2008 for U.S. Appl. No. 11/152,462, 27 pages.
OA Dated Apr. 6, 2009 for U.S. Appl. No. 11/680,431, 33 pages.
OA Dated Mar. 25, 2009 for U.S. Appl. No. 11/556,604, 59 pages.
OA Dated Apr. 10, 2009 for U.S. Appl. No. 10/351,069, 27 pages.
Rahim, et al. Optimal Decision Rules for Determining the Length of Production Run, (Abstract Only), Computers and Industrial Engineering, vol. 9, No. 2, pp. 195-202, 1985.
Rahim, et al. "Optimal Production Run for a Process Having Multi-level Tool Wear," (Abstract only), International Journal of Systems Science, vol. 19, No. 1, pp. 139-149, 1988.
Rahim, et al. "Optimal Production Run for a Process with Random Linear Drift," (Abstract only), Omega, vol. 16, No. 4, pp. 347-351, 1988.
"Screen Savers," Lawyer, Feb. 19, 2001.
Sjostrom. Price Discrimination by Shipping Conferences. Logistics and Transportation Review, Jun. 1992, [from Dialog® File 15, acc. No. 00727777 93-76998].
Stacklin. "Bridgestone Printing Unit Teams with ewinwin", Mar. 25, 2002, Crain's Cleveland Business, vol. 23, issue 12, 3 pages.
Tanaka. "As Other Companies Crumble, Ecount Carves Out Niche in Online-Payment Services." Knight Rider Tribune News Service, Washington, Feb. 27, 2002. (Recovered from ProQuest Database Dec. 4, 2006.).
"The Oil and Gas Asset Clearinghouse, a Pertoleum Place Company, to Host It's Second Exclusively Online Auction of Oil and Gas Properties on Aug. 14-16, 2000." PR Newswire, p. 5591, Aug. 3, 2000, 2 pages.
Thomas, et al. JIT: Strategies for Distant Suppliers (Abstract). Business, vol. 40, No. 4, pp. 36-39, Dec. 1990.
Wayback Machine. "Searched for http://www.ewinwin.com/corp/ewinwinwhitepaper.pdf" , Oct. 2, 2008, Archive.org.
Yeh, et al. "Optimal Production Run Length for Products Sold with Warranty," (Abstract only), European Journal of Operational Research, vol. 120, No. 3, pp. 575-582, Feb. 1, 2000.
Meridex Introduces Advanced Features to its B2B Network, PR Newswire, May 25, 2000. http://www.canadait.com/cfm/index.cfm?It=106&Id=3421&Se=355&Sv=Company&Lo=441. Last accessed Apr. 30, 2009, 3 pages.
MobShop Launches New Rev of Selling App, Online Reporter, May 28, 2001. http://findarticles.com/p/articles/mi_hb5932/is_200105/ai_n23884526/. Last accessed Apr. 30, 2009, 2 pages.
OA dated Jul. 2, 2009 for U.S. Appl. No. 09/426,063, 24 pages.
OA dated Apr. 29, 2009 for U.S. Appl. No. 10/464,585, 19 pages.
OA dated Sep. 9, 2009 for U.S. Appl. No. 11/556,604, 60 pages.
Mullich. Altrade Serves as a Natural Resource - A Head Start and Big Trading Volume Give the Natural Gas Marketplace a Competitive Edge. Can it Last? Information Week, 152, Jun. 12, 2000, 3 pages.
China - Welcome to the Machine: New Machinery, Electronics B-to-B Website Launched. China Online, Jul. 24, 2000, 1 page.
DomainTradeLIVE! Launched by solutionhome.com. Business Wire, Oct. 20 , 1999, 1 page.
Beaty. Mass Customization. Manufacturing Engineer, vol. 75, issue 5, Oct. 1996, pp. 217-220.
Easley, et al. Time and the Process of Security Price Adjustment, Journal of Finance, vol. 47, No. 2, Jun. 1992. http://ideas.repec.org/a/bla/jfinan/v47y1992i2p576-605.html. Last accessed Sep. 10, 2009, 30 pages.
Medrano, et al. Strategic Behaviour and Price Discovery, RAND Journal of Economics, vol.32, No. 2, Jun. 21, 2001. https://editorialexpress.com/cgi-bin/rje_online.cgi? action=view &year=2001&issue=sum&page=221&&tid=83197&sc=uogfbloa. Last accessed Sep. 3, 2009, 29 pages.
O'Gorman, et al. Considerations for Connecting Renewable Generation into Bulk Supply Networks. Sixth International Conference on Advances in Power System Control, Operation and Management, ASDCOM 2003, vol. 2, Nov. 11-14, pp. 674-680. Last accessed Sep. 10, 2009, 7 pages.
Scott. Chains of Trust, Supply Chain Management, Manufacturing Engineer, vol. 75, issue 4, Aug. 1996, pp. 172-174.
Scott. Supply Partnerships and the Effective Management of Low Cost Components. Transforming Your Material Flow: A Practical Insight Into World Class Logistics and Supply Chain Management IEE Colloquium on, Mar. 19, 1996, pp. 2/1-2/4.
Scott. Supply Partnerships in the Aerospace Industry. Transforming Your Material Flow: A Practical Insight Into World Class Logistics and Supply Chain Management IEE Colloquium on, Oct. 24, 1996, pp. 3/1-3/3.
Watson. The Effects of Demand Forecast Fluctuations on Customer Service and Inventory Cost When Demand is Lumpy. Journal of the Operational Research Society, vol. 38, No. 1, pp. 75-82, Jan. 1987. http://www.palgrave-journals.com/jors/journal/v38/n1/abs/jors19879a.html. Last accessed Sep. 10, 2009, 8 pages.
Dibiase. The Inventory Simulator: A Micro Computer Based Inventory Model. Modeling and Simulation on Microcomputers, Paul F. Hogan, ed., Society for Computer Simulation (SCS), La Jolla, pp. 104-106, Jan. 1987.
International Search Report for PCT Application No. PCT/US 07/89195, mailed May 12, 2008, 8 pages.

Kantrow, American Express Sets a Three-Tier Pricing on Optima, Dialog: File 148 #05812190 (The Gale Group), American Banker, v157, n25, p1(2), Feb. 6, 1992.

Koenig, et al. Quantitative Industrial Ecology. IEEE Transactions on Systems, Man and Cybernetics, Part C, Issue 1, Feb. 1998, pp. 16-28.

Lamparter. "Natural Selection." American Printer, vol. 217, No. 3, pp. 54-64, Jun. 1996.

"Lucent Launches On-Line Catalog" M2 Presswire, Jan. 22, 1999.

Magna Cash Cybersource Partner to Expand Online Payment Options. PR Newswire, New York, Jan. 15.

Maxwell, Pricing education in the United States of America: responding to the needs of business, The Journal of Product & Brand Management, Santa Barbara, Aug. 1998, vol. 7, Issue 4, pp. 336-341.

Mesaros. Innovation in Difficult Times : How US Manufacturers are Using Demand Aggregation to Increase Sales and Lower Costs. July 26, 2001. Last accessed Mar. 19, 2008, 4 pages.

Meriam Webster's Collegiate Dictionary, Tenth Edition, 1997, p. 732.

Moody. From E-Commerce to We-Commerce. Computer Weekly, 42, June 3, 1999. Last accessed Apr. 9, 2009, 2 pages.

Myers. "E-Solutions for Surplus Inventory," Dsn Retailing Today, vol. 39, No. 21, p. 13, Nov. 6, 2000.

Nellore, et al. Factors Influencing Success in Integrated Product Development (IPD) Projects. IEEE Transactions on Engineering Management, vol.48, issue 2, May 2001, pp. 164-174.

* cited by examiner

| BUYER DATA NAME, ADDRESS, CONTACT, ETC. | USER NAME | PASSWORD | CREDIT CARD NO. & EXP. |
|---|---|---|---|
| BUYER 1 | USER NAME (1) | PASSWORD (1) | XXXXXXXXX EXP. 05/03 |
| . . . | . . . | . . . | . . . |
| BUYER (N) | USER NAME (N) | PASSWORD (N) | CREDIT CARD (N) |

| SELLER DATA NAME, ADDRESS, CONTACT, ETC. | USER NAME | PASSWORD | CREDIT CARD NO. & EXP. |
|---|---|---|---|
| SELLER 1 | USER NAME (1) | PASSWORD (1) | XXXXXXXXX EXP. 07/03 |
| ... | ... | ... | ... |
| SELLER (N) | USER NAME (N) | PASSWORD (N) | CREDIT CARD (N) |

PRODUCT INFORMATION SHEET

Description of Product:

Minimum order Quantity:

Total Quantity of Products Available:

Desired Start Time & Date:

Desired End Time & Date:

Desired Pricing Scheme:

| Total Products Ordered | Price/Product |
|---|---|
| 0-100 | $100 |
| 101-200 | $90 |
| 201-300 | $80 |
| 301-400 | $70 |
| 401-500 | $60 |

Fig. 13

E-COMMERCE VOLUME PRICING

CROSS-REFERENCE TO RELATED APPLICATIONS

This application is a continuation of U.S. patent application Ser. No. 10/370,237, filed on Feb. 20, 2003 and entitled E-COMMERCE VOLUME PRICING, which is a continuation of U.S. patent application Ser. No. 09/324,391, filed Jun. 3, 1999 and entitled E-COMMERCE VOLUME PRICING, now abandoned, which claims the benefit of U.S. Provisional Application Ser. No. 60/133,769, filed May 12, 1999 and entitled E-COMMERCE VOLUME PRICING. The entireties of these applications are incorporated herein by reference.

TECHNICAL FIELD

The present invention relates to an e-commerce volume pricing methodology and more particularly to a method and apparatus of using the e-commerce volume pricing methodology to conduct business electronically.

BACKGROUND OF THE INVENTION

The buying and selling of goods and services (collectively referred to as "products") has resulted in a vast array of costing schemes which are used to select the price at which such products are sold.

One of the most common costing schemes which consumers encounter everyday is known as fixed pricing. According to this costing scheme, sellers set a fixed price for the their products based on a past demand for the product and/or anticipated future demand. Buyers desiring to purchase products from the seller are each required to pay the same fixed price regardless of the number of products purchased. If a seller finds that the demand for a given product is greater or less than expected, the seller may later adjust the fixed price of the product to account for such findings. Although the fixed pricing provides a simple way for a seller to conduct business with multiple buyers, one drawback of this costing scheme is that it fails to reward buyers willing to purchase greater quantities of products. Accordingly, the discount quantity pricing scheme evolved.

The discount quantity pricing approach to costing involves pricing a product at different levels depending on the quantity of products a customer is willing to purchase. The more products a customer is willing to purchase, the lower the price. Sellers have incentive to lower price for large quantity buyers since the fixed costs associated with producing the product is spread over more items. Thus, sellers are able to make equal or greater profits despite the lowered price of the product. While volume pricing offers a benefit to larger buyers who are able to purchase large quantities of goods at one time, smaller buyers are often unable to obtain the lowered prices and therefore are more likely to "shop around" for the best available deal. This, in turn, hurts both the buyer and seller. For instance, the smaller buyer is burdened with needing to search for alternative deals and still often ends up paying a higher price than larger buyers. The sellers, on the other hand, are faced with lost business since they are unable to reduce their price for the smaller buyers and still make sufficient profit.

Another common costing scheme for pricing a product is an auction. In an auction, a seller sets an initial price for an item and then multiple buyers are given an opportunity to bid against each other for the product. The buyer having placed the highest bid for the product at the end of the auction purchases the product at the final price bid. In order to provide a larger forum for buyers and sellers, a recent trend has been to auction goods electronically over the Internet. For example, one company known to operate an auction site over the Internet is eBay, Inc. Although auctions provide advantages when selling unique products for which customers are willing to competitively bid, the auction forum is not well suited for sellers desiring to sell large quantities of goods to multiple buyers given the inherent inefficiencies involved with selling one product at a time in a bidding environment.

Yet another costing scheme which has been advanced in recent years is buyer-driven bidding. According to this costing scheme, a single buyer desiring to obtain a product communicates a price at which the buyer is willing to purchase the product to multiple sellers. Each of the sellers is provided an opportunity to review the buyers price. A sale is complete when one of the sellers agrees to sell the product to the buyer at the price suggested by the buyer. A buyer-driven bidding scheme is described in U.S. Pat. No. 5,794,207 assigned to Walker Asset Management Limited Partnership of Stamford, Conn. While the buyer-driven bidding scheme provides advantages for certain types of transactions when, for example, sellers may be willing to sell products at lower than normal prices, the uncertainties involved with whether a buyer's offer will be accepted is often problematic for high volume commercial transactions in which the reliability that a transaction will be complete is of paramount importance.

While the costing schemes described above have various advantages and disadvantages in different situations, a commonality among all of the costing schemes is that each buyer operates independently with one or more sellers to set a purchase price of a product. For example, in the fixed pricing scheme and discount quantity purchasing scheme, buyers individually determine whether the sellers preset price schedule is acceptable regardless of whether other buyers have decided to purchase the product or not. In an auction, not only do buyers operate independent of other buyers but, in fact, each buyer's decision to place a bid has a negative effect on all other buyers desiring to purchase the same good since the price of the good increases. Similarly, in a buyer-driven bidding scheme, each buyer is completely unaware of the amount other buyers are bidding for a given product.

The independent operations of the buyers stems from a combination of the fact that: 1) the costing schemes discussed above provide little incentive for buyers to work together and 2) there are large inconveniences for buyers to facilitate communication about their buying activities to other buyers. Unfortunately, such independent operation by buyers can result in missed opportunities for both the buyer and seller. For example, in instances where two independent buyers are unable to afford a product, neither buyer informs the seller of their respective desire to purchase the product. Accordingly, sales of the product to these buyers do not take place. However, if the seller had been aware that multiple buyers are interested in purchasing a product, the seller may have been able to offer the product at a quantity discounted price which was affordable for both buyers. Due to the independent operations by each of the buyers, such information is never communicated thereby resulting in missed opportunities for both the buyers and seller alike.

Accordingly, there is a strong need in the art for a volume costing scheme which overcomes the above mentioned drawbacks and others.

SUMMARY OF THE INVENTION

According to a preferred embodiment of the present invention, a volume pricing methodology is provided. The volume pricing methodology is structured to provide incentive for buyers to work together when purchasing products. By working together, buyers are able to take advantage of lower pricing due to quantity discounts. To facilitate buying and selling products using the volume pricing methodology, an electronic forum is provided whereby buyers and sellers are able to conveniently exchange information and order products.

In the volume pricing methodology, a seller initially establishes a price structure for a product which provides for lower prices as larger quantities of the product are purchased. The price structure is preferably set up so as to provide discounted prices based on the cumulative orders placed by multiple buyers. The price structure is electronically made available to potential buyers of the product. For example, the price structure may be displayed on an Internet site. The sellers further establish an "open session" period during which orders for the product are accepted. During the open session, multiple buyers are able to place orders for the product. At the end of the open session, the total quantity of products collectively ordered by all of the buyers is determined. Based on the total quantity ordered, the final price to all buyers is the lowest price provided from the price structure regardless of whether the lowest price had been reached at the time a particular buyer placed their order during the open session. In other words, at the time of placing an order, a buyer is guaranteed not to pay an amount greater than the corresponding price from the price structure for the total products purchased thus far. However, as more buyers purchase products during the open session, the final price for all buyers may fall.

Accordingly, the volume pricing methodology provides incentive for multiple buyers to work together to immediately lower a price of a product. Further, small buyers who may otherwise not place an order for a product are provided an opportunity to obtain quantity discounted pricing thereby making the product affordable. The purchase of products by smaller buyers also may help larger buyers obtain even greater quantity discounted pricing. Thus, there is incentive for all buyers to work together regardless of size. If fact, upon ordering a product, buyers will likely be motivated to endorse the product and refer other buyers to purchase the same product so as to obtain even lower pricing. Accordingly, the costing scheme of the present invention will often result in the seller's product being marketed by the buyers themselves. Further, the convenient electronic forum in which multiple buyers are able to order and track the current status of a product up for sale provides further incentive for the buyers to work together to lower costs for all since little additional effort is needed.

Thus, according to one aspect of the present invention, a method of costing is provided. The method of including the steps of electronically offering a product for sale, receiving a first order for the product at a first price, receiving a second order for the product at a second price, the second price being lower than the first price, and accepting to fill the first order and the second order at a third price equal to or less than the second price.

In accordance with another aspect of the present invention, a method of costing is provided. The method includes the steps of electronically offering a product for sale in accordance with a price schedule, the price schedule setting a price for the product which varies in accordance with a quantity of the product ordered, receiving orders for the product from a plurality of different buyers, calculating a total quantity of products ordered from the plurality of different buyers, determining a lowest price for the product from the price schedule based on the total quantity of products ordered, and accepting to fill the orders for each of the plurality of different buyers at the lowest price.

In accordance with yet another aspect of the present invention, a server is provided. The server includes a processor, a memory coupled to the processor, and a network interface coupled to the processor for transmitting and receiving data with at least one remote computer system, wherein a price schedule for a product offered for sale electronically is stored in the memory, the price schedule providing a price for the product which varies in accordance with a quantity of the product ordered, and wherein the server is configured to receive orders for the product from a plurality of different buyers via the at least one remote computer system, calculate a total quantity of products ordered from the plurality of different buyers, and determine a lowest price for the product from the price schedule based on the total quantity of products ordered.

In accordance with still yet another aspect of the present invention, a system for conducting business electronically is provided. The system includes a central server, at least one computer system coupled to the server via a network, wherein a price schedule for a product offered for sale electronically is stored in the central server, the price schedule providing a price for the product which varies in accordance with a quantity of the product ordered, and wherein the server is configured to receive orders for the product from a plurality of different buyers via the at least one remote computer system, calculate a total quantity of products ordered from the plurality of different buyers, and determine a lowest price for the product from the price schedule based on the total quantity of products ordered.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

BRIEF DESCRIPTION OF THE DRAWINGS

In the annexed drawings:

FIG. 7 illustrates a buyer database stored in a central server in accordance with one aspect of the present invention;

FIG. 11 illustrates a seller database stored in the central server in accordance with one aspect of the present invention;

FIG. 13 illustrates a product information sheet completed by a seller opening a deal room in accordance with one aspect of the present invention;

DETAILED DESCRIPTION OF THE INVENTION

The present invention will now be described with respect to the accompanying drawings in which like numbered elements represent like parts.

Figure 1:
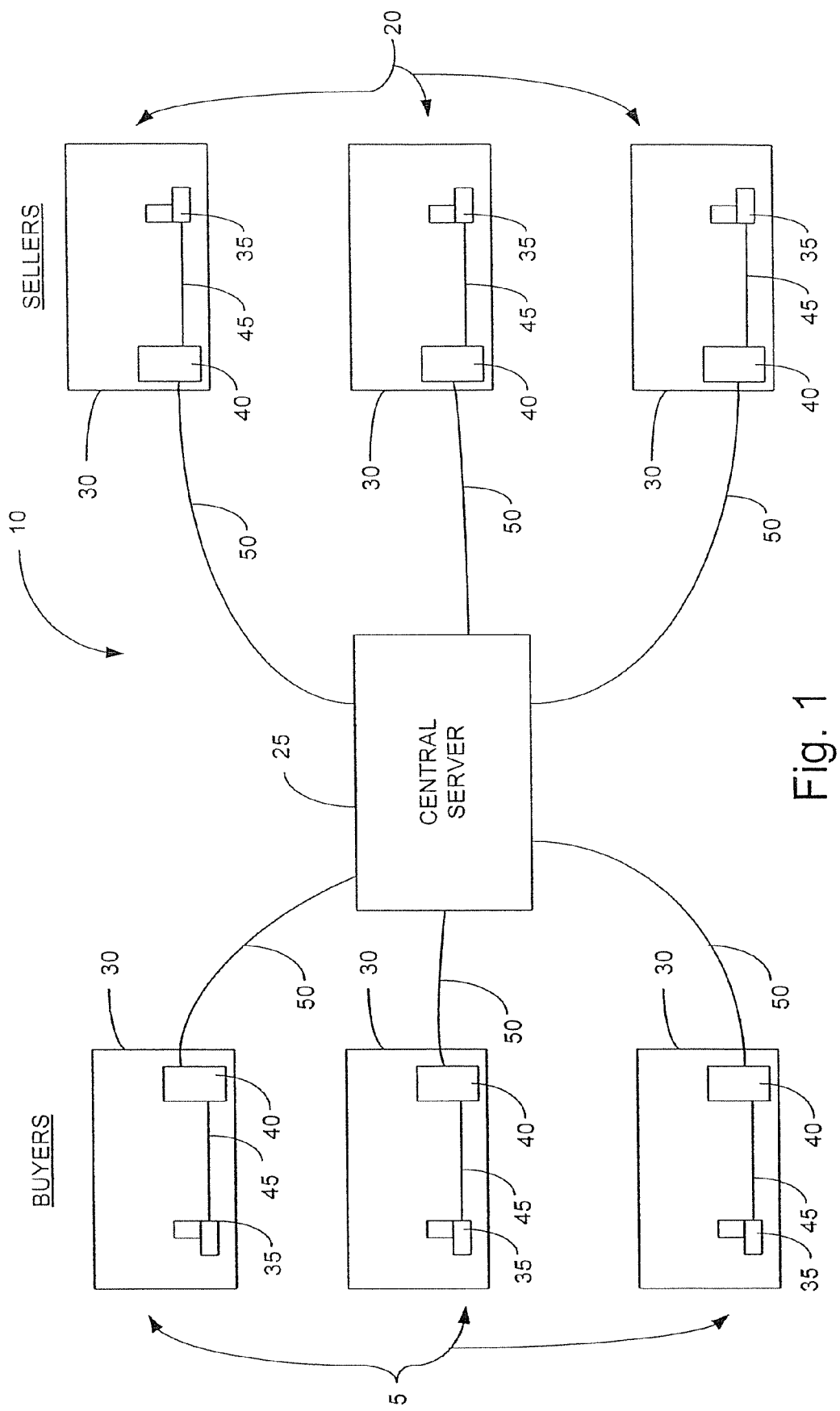
FIG. 1 illustrates a diagrammatic view of a system for electronically conducting business in accordance with one aspect of the present invention.

Referring initially to FIG. 1, a system 10 is shown in which multiple buyers 15 and sellers 20 are electronically linked via a central server 25. As discussed in more detail below, the central server 25 is configured to provide the buyers 15 and sellers 20 with a convenient forum in which to buy and sell goods in accordance with a volume pricing methodology described herein. The forum may, for example, be a preestablished Internet web page where sellers 20 are able to post product information and the buyers 15 are able to order the products. The volume pricing scheme preferably calls for a seller 20 to post a pricing structure for a product which provides discounted pricing as more products are purchased during a preset "open session" period. Each buyer 15 is able to place an order for the product during the open session at the then current price. At the end of the open session, the total quantity of products ordered by all buyers 15 is calculated, and the product is sold to all buyers 15 at the same lowest price based on the preset price for that quantity amount. In this manner, each of the buyers 15 work together to increase the total quantity of products purchased so that all of the buyers 15 realize discounted pricing due to the cumulative order.

Each of the buyers 15 and sellers 20 may access the central server 25 in any of a variety of ways. For example, in the present embodiment, each buyer 15 and seller 20 is shown to be part of separate establishments 30 which include one or more respective computer systems 35 and local servers 40. The computer systems 35 may, for example, be a desktop or laptop computer with a local area network (LAN) interface for communicating over a network backbone 45 to the local server 40. The local servers 40, in turn, interface with the central server 25 via a network cable 50 or the like. It will be appreciated that while the present embodiment depicts the computer system 35 communicating with the central server 25 via hardwired network connections, in an alternative embodiment the computer system 35 may interface with the central server 25 using a modem, wireless local area and/or wide area networks, etc. Further, it will be appreciated, that while the buyers 15 and sellers 20 are shown to communicate with the central server 25 via different computer systems 35, it will be appreciated that the buyers 15 and/or sellers 20 may access the central server 25 from the same computer system 25.

Figure 2:
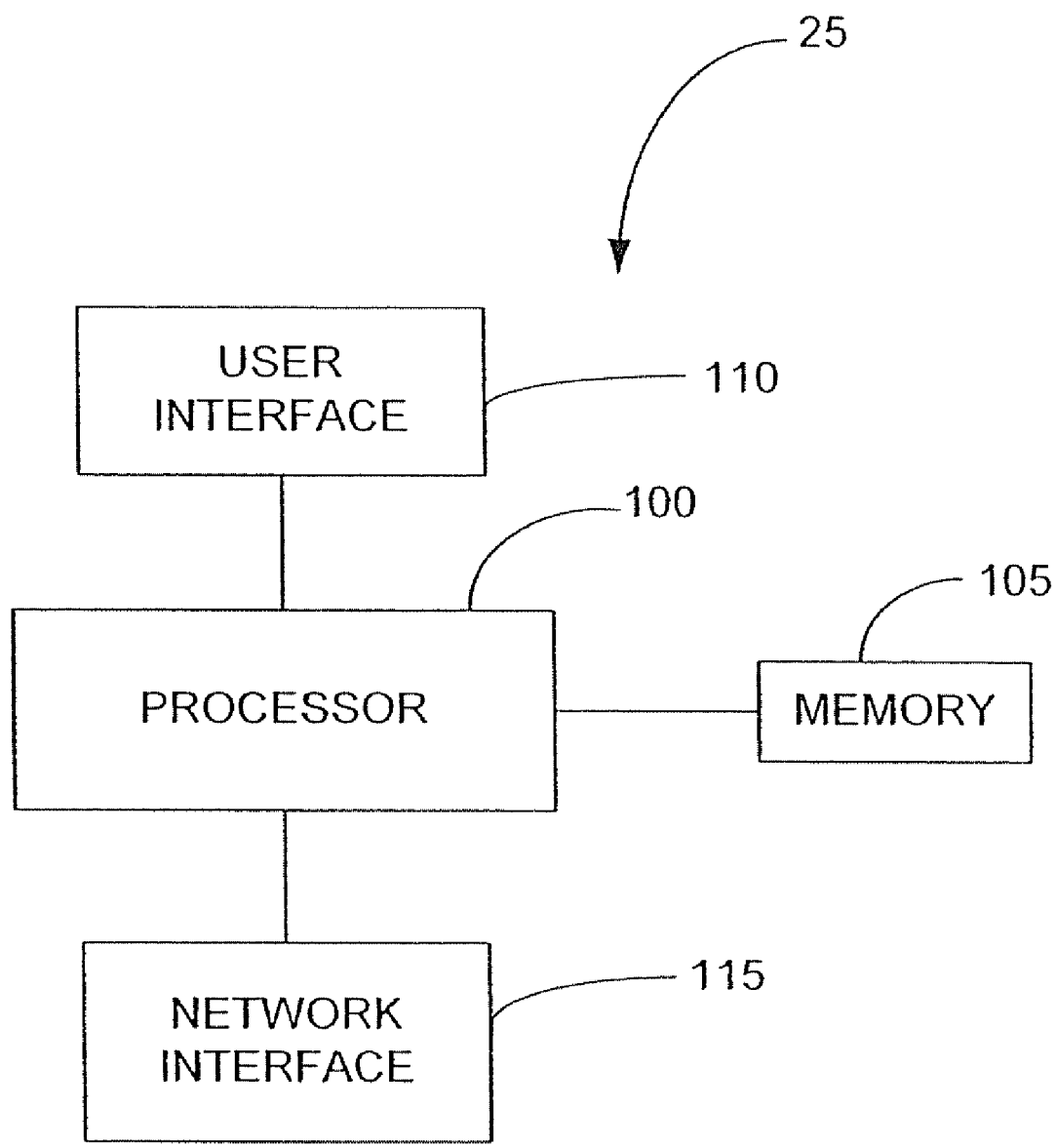
FIG. 2 illustrates a block diagram of a central server in accordance with one aspect of the present invention.

Turning now to FIG. 2, a block diagram of the hardware components of the central server 25 is shown. In particular, the central server 25 includes a central processor 100 for performing the various functions described herein. A memory 105 is coupled to the processor 100 and stores operating code and other data associated with the operations of the central server 25. A user interface 110 is also coupled to the processor 100 and provides an interface through which the central server 25 may be directly programmed or accessed. The user interface 110 may, for example, be an alphanumeric keyboard and mouse. A network interface 115 coupled to the processor 100 provides multiple connections for transceiving information with buyers 15 and sellers 20 over the network cables 50.

Figure 3:
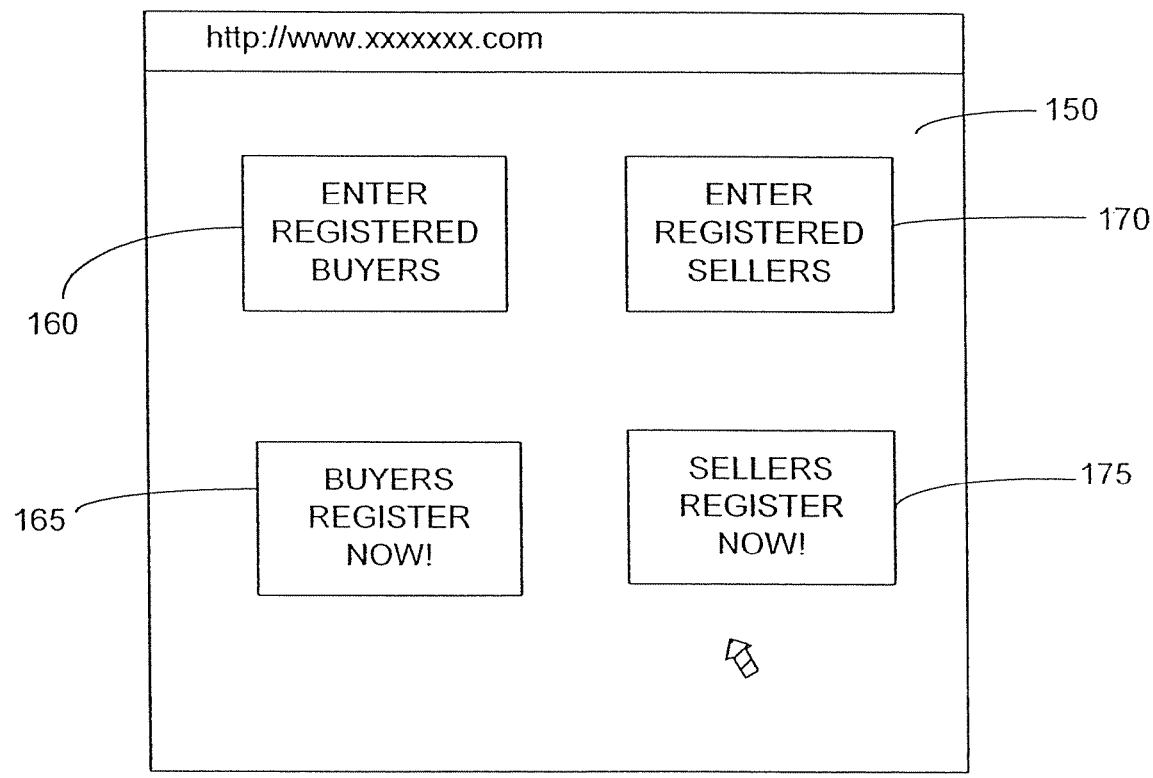
FIG. 3 illustrates a web page providing options to buyers and sellers desiring to conduct business electronically in accordance with one aspect of the present invention.

Turning now to FIG. 3, an exemplary Internet web page 150 which provides buyers 15 and sellers 20 with access to a forum for conducting business using the volume pricing methodology described in detail below, is shown. The web page 150 is shown in to include hyperlinks 155 for handling both registered and un-registered buyers and sellers of products. For example, as shown in FIG. 3, registered buyers may select a hyperlink to a registered buyer login screen via hyperlink 160 while non-registered buyers may select a hyperlink to a non-registered buyer registration screen via hyperlink 165. Similarly, registered sellers may select a hyperlink to a registered seller login screen via hyperlink 170, while non-registered sellers may select a hyperlink to a non-registered seller registration screen via hyperlink 175. While the present embodiment shows separate hyperlinks for buyers and sellers, it will be appreciated that such hyperlinks could alternatively be combined and the status of buyer or seller could be determined during a later stage in the login procedure.

Figure 4:
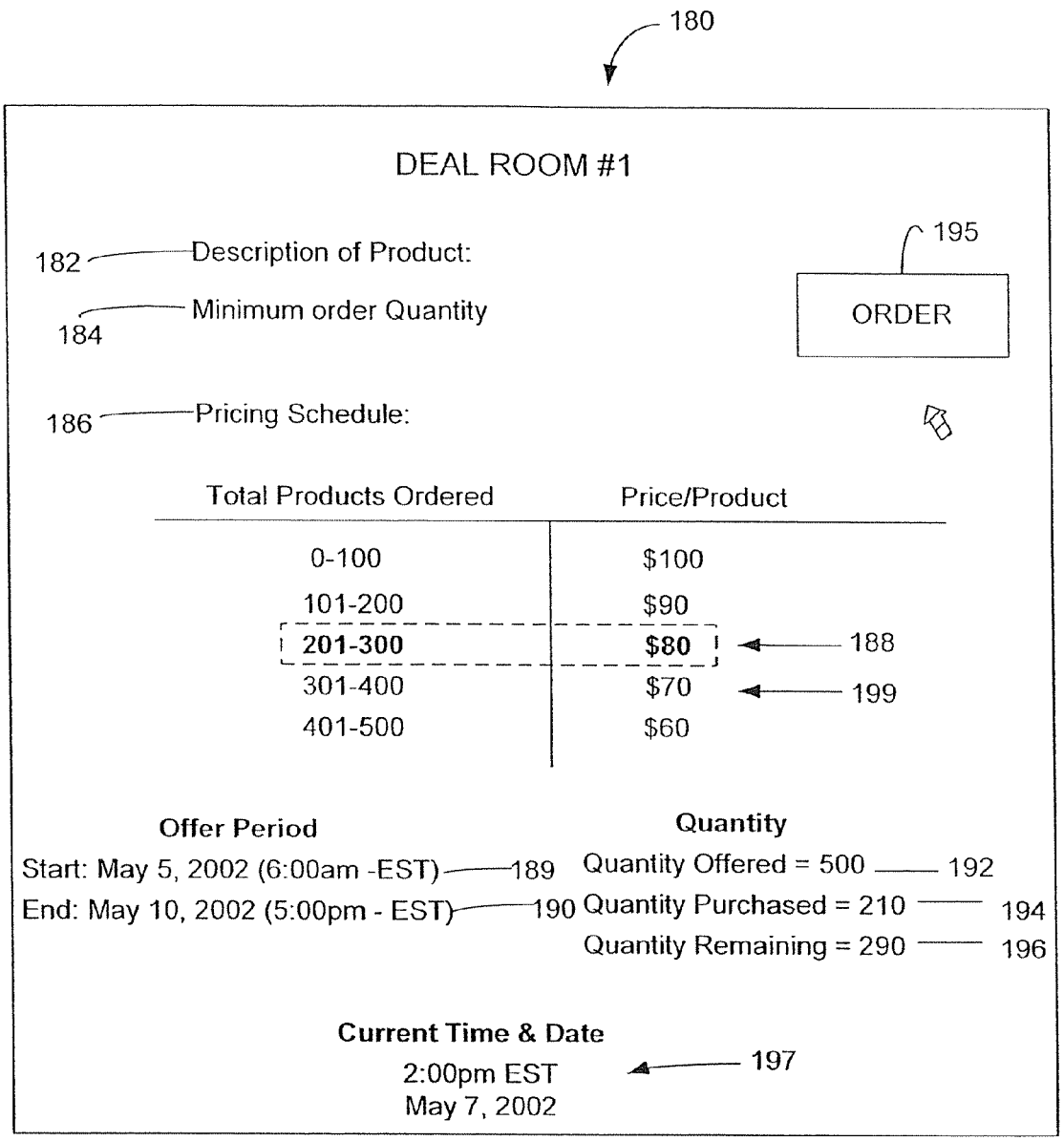
FIG. 4 illustrates a deal room in which buyers may place electronic orders for products posted by sellers in accordance with one aspect of the present invention.

Turning now to FIG. 4, in accordance with one embodiment of the present invention, registered sellers 20 set up deal rooms 180 in which registered buyers 15 are able to order products. The deal rooms 180 provide a convenient forum for sellers to receive orders from multiple buyers during an "open session" period. Based on the cumulative orders received at the end of the open session period, a seller provides all buyers with the same quantity discount for the product regardless of what the price of the product was at the time each buyer placed the order. Thus, in accordance with the present embodiment of the invention, each buyer is able to benefit from other buyers ordering the same product since the cumulative orders received at the end of the open session determines the price for all buyers 15 placing orders during the open session.

As will be discussed in more detail below, the deal rooms 180 of the present embodiment are set up to display the following information which is input from the seller 20 and/or calculated by the processor 100 of the central processor 25 during an open session: product name/description 182; minimum order quantity 184; price schedule 186 with current price level highlighted 188; offer start time 189; offer end time 190; total quantity of products made available 192; total quantity purchased to date 194; total quantity available 196; current time and date 197. The time between the offer start time and the offer end time is referred to as the "open session"

period. Based on such information, buyers 15 visiting the deal room 180 can make an informed decision as to whether they desire to place an order for the product. If a buyer 15 desires to place an order, the buyer 15 selects an order icon 195 displayed within the deal room 180 to continue the purchasing steps.

For example, in the deal room 180 shown in FIG. 4, a buyer (Buyer A) visiting the deal room 180 at time t1 may initially review the current price of a product as highlighted at 188 and review the end time 190 for the product offering. At time t1, the price for the product as highlighted at 188 indicates that the price/product is $80. Further, the total products ordered to date is shown to be a quantity of 220. Buyer A next determines whether they are interested in purchasing the product keeping in mind the minimum order quantity set by the seller 20 which in this case is 10 units. If Buyer A decides to order the product, Buyer A selects the order icon 195 and places an order for a desired quantity. In the present example, Buyer A places an order for 70 products. After the order is placed, the total products ordered to data is 290 (220+70) and the price/product remains at $80 as determined from the pricing schedule 186. Next, at time t2, another buyer (Buyer B) enters the deal room and decides to place an order for 30 more products. After Buyer B places the order, the total products ordered to date is 320 (290+30) and the price/product is lowered to $70 as determined from the pricing schedule. The placing of orders by additional buyers continues until the open session period is over. At the end of the open session period, the price of the product to all of the buyers is the price at the time the open session period ended. For example, in the present instance, if the open session period ended after Buyer B placed their order, the price of the product for Buyer A, Buyer B and all other buyers ordering products during the open session period is $70 even though orders by one or more buyers may have been placed at a higher price level. In this manner, the buyers are able to work together to lower the cost of a product for all buyers. Further, even small buyers who would otherwise not be able to obtain volume discount pricing are able to share in the lowered cost and provide a benefit to the larger buyers.

Figure 5:
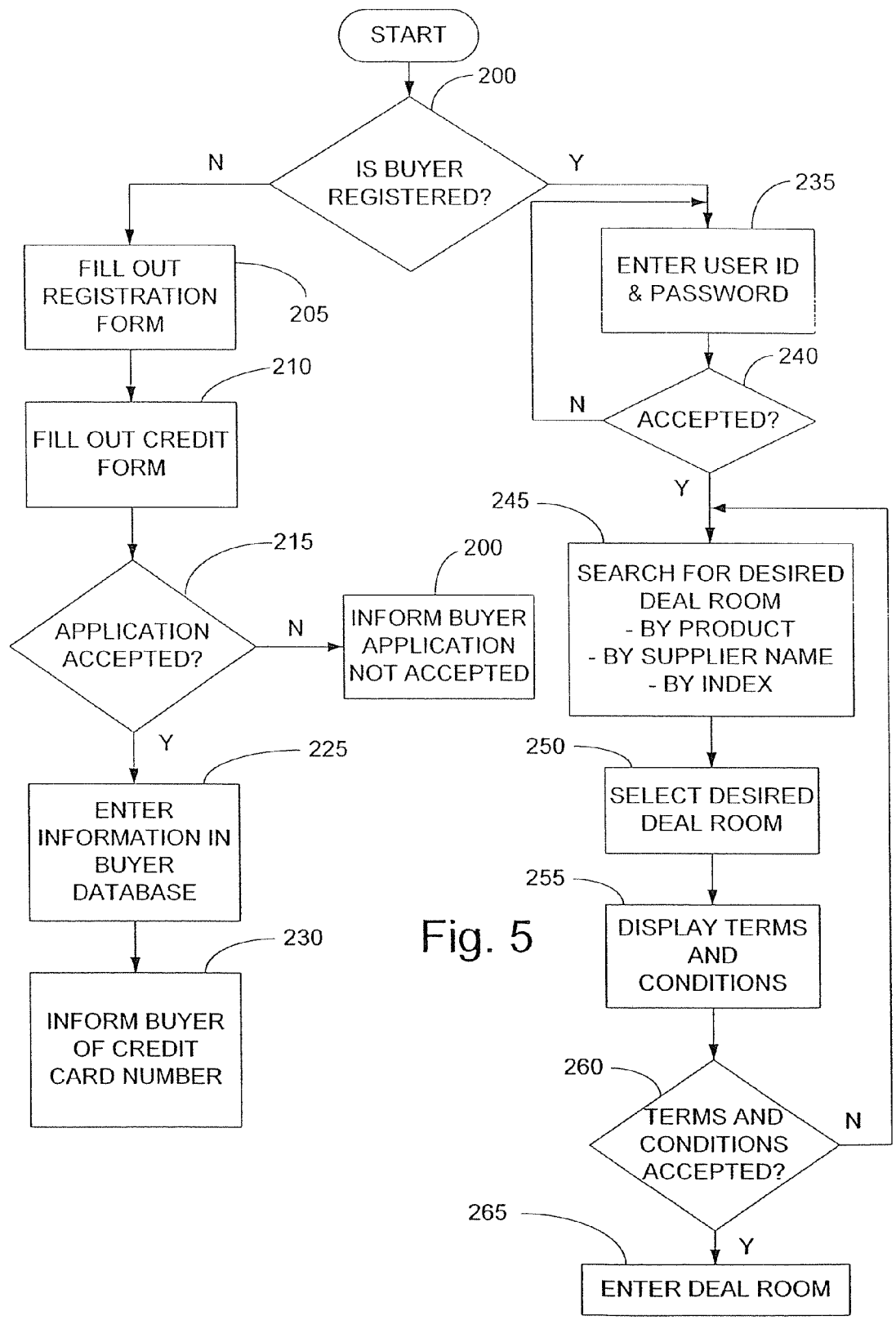
FIG. 5 illustrates a flow chart for a buyer desiring to conduct business electronically in accordance with one aspect of the present invention.
Figure 6:
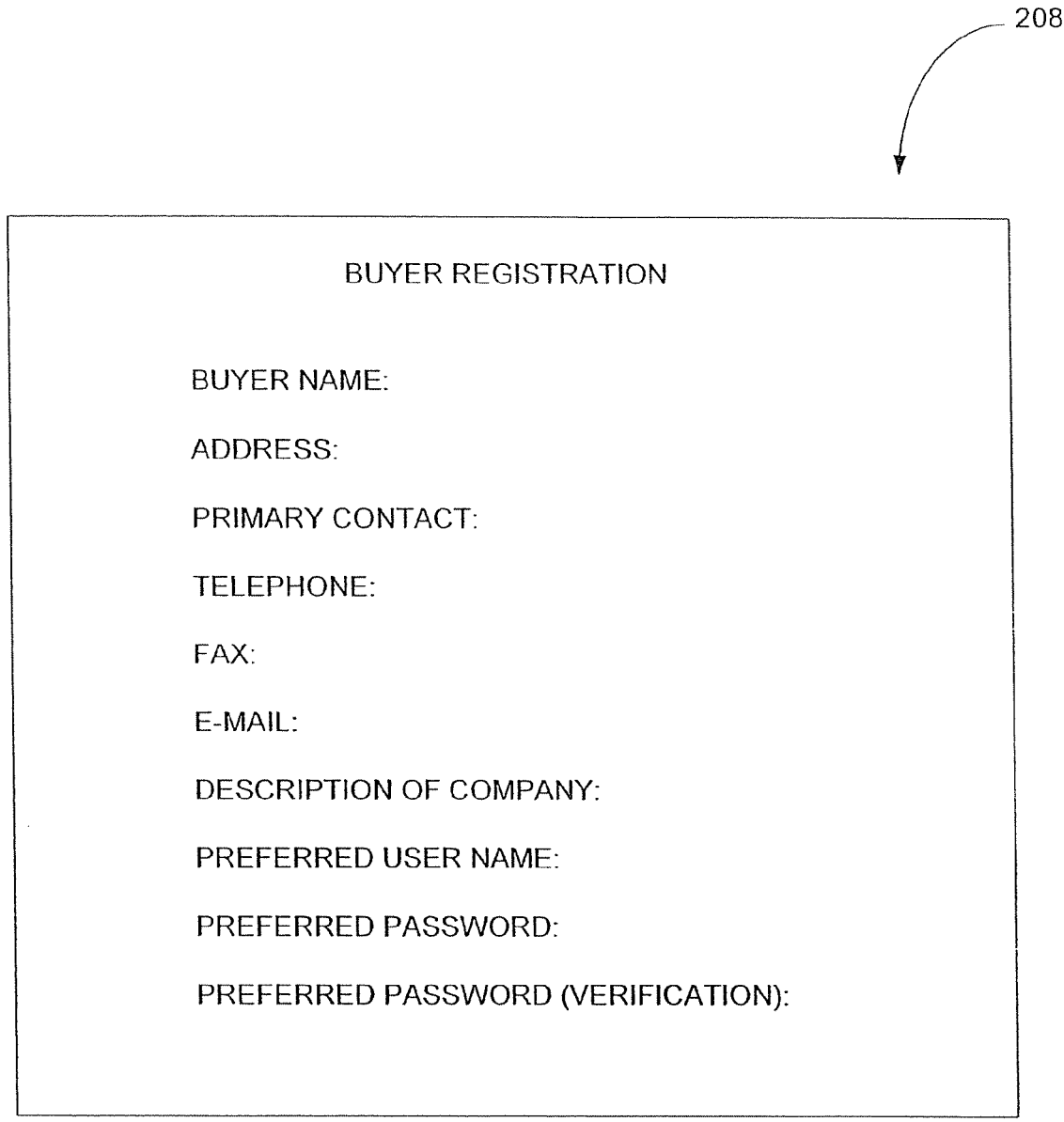
FIG. 6 illustrates an on-line registration form for a buyer in accordance with one aspect of the present invention.

Turning now to FIG. 5, the general steps taken by a buyer 15 entering the web page 150 is shown. More particularly, in step 200 it is initially determined whether a buyer 15 is registered or not. If the buyer 15 is not registered, the buyer 15 selects hyperlink 165 (FIG. 3) and proceeds to step 205. In step 205 the processor 100 of the central server 25 request that the buyer 15 fill out a registration form. For example, the buyer 15 is requested to fill out a registration form 208 such as that shown in FIG. 6. In the present example, the registration form 208 requests that the buyer 15 enter the following information: buyer name; address; primary contact person; phone; fax; e-mail; short description of company; preferred login user name; and preferred password. With respect to the user name and password, the processor 100 is configured to determine whether the selected user name and password combination are available and, if not, to prompt the buyer 15 to enter a new user name and password until an available combination is selected.

Continuing to refer to FIG. 5, in step 210, the buyer is requested to fill out a credit card application so that purchases made on the web site may be immediately approved. The credit card registration and approval process may be accomplished via a hyperlink to one of various electronic credit card approval agencies which check the buyer's credit rating and set up a merchant account with a line of credit. For example, an electronic credit card approval agency which may be used in conjunction with the present invention can be found on the Internet at http://www.interent-ecommerce.com. Next, in step 215, the processor 100 determines if the credit card application has been approved by the electronic credit card approval agency. If the credit card application has not been approved, the processor 100 proceeds to step 220 where a message is sent back to the buyer 15 indicating regret that they have not been approved for a line of credit and therefore have not successfully completed the registration process. In step 220, a customer service telephone number also is provided to the buyer 15 in case the buyer has questions and/or desires to pursue registration further.

If in step 215, the processor 100 is informed that the buyer 15 has been provided a line of credit and a credit card number has been issued, the processor 100 proceeds to step 225. In step 225 the buyer information from the registration form 208 and the newly issued credit card number are stored in a buyer database 300 (FIG. 7) in the memory 105 of the processor 25 (FIG. 2). Next, in step 230, the processor 100 is configured to provide the buyer 15 with the newly issued credit card number so that the buyer 15 is able to purchase products. Further, the processor 100 is configured to provide a report to a system administrator who then mails a confirmation copy of the buyer's information stored in the buyer's database to the buyer 15. This completes the buyer's registration process.

Continuing to refer to FIG. 5, if in step 200, a buyer has already registered, the buyer 15 may login as a registered user by selecting the registered user hyperlink 160 (FIG. 3). Once selected, the processor 100, in step 240 prompts the buyer 15 to enter their user ID an password. Upon entry of such information, the processor 100 in step 240 verifies the user ID and password with those stored in the buyer database 300 (FIG. 7). If the user ID and password entered by the buyer 15 does not match any entry in the buyer database 300, the processor 100 in step 240 returns to step 235 for re-entry of such information. If, however, in step 240, a valid user ID and password are entered, the processor 100 proceeds to step 245.

Figure 8:
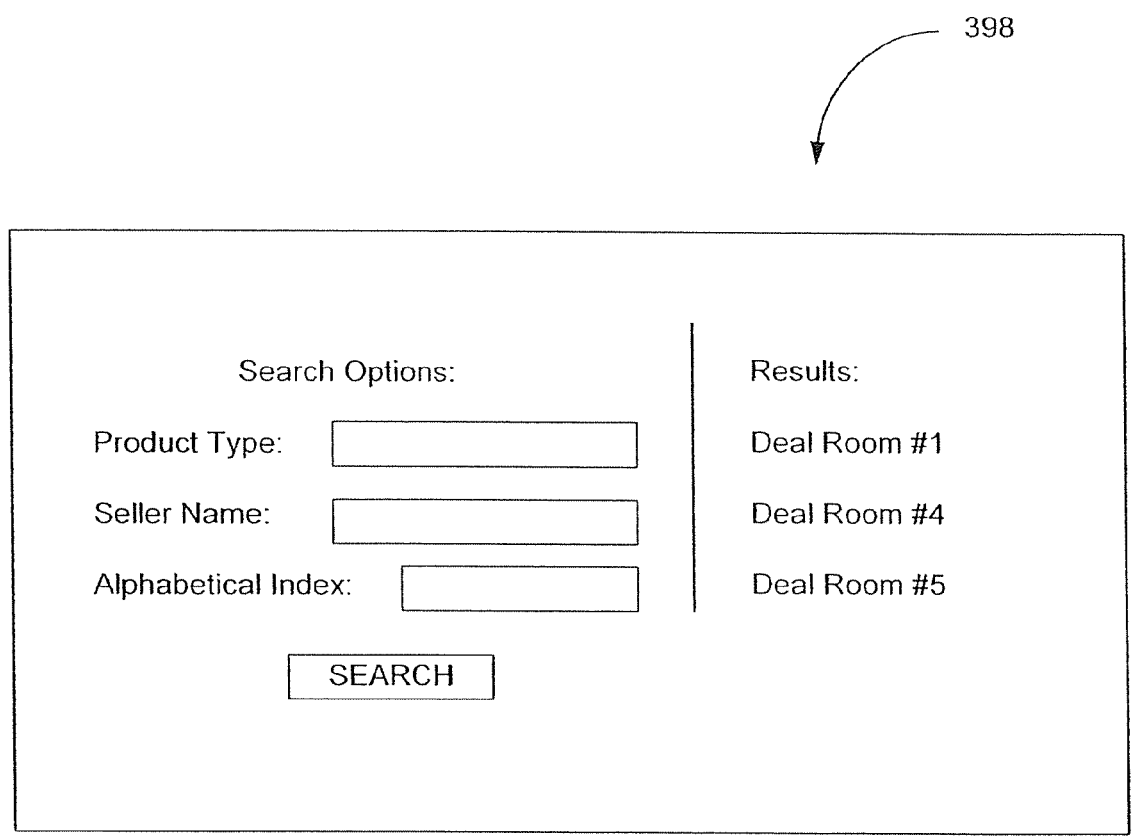
FIG. 8 illustrates a web page for a buyer to search for a desired deal room in accordance with one aspect of the present invention.

In step 245, the processor 100 provides the buyer 15 with a search screen where the buyer 15 is able to select various deal rooms 180 they wish to enter. As discussed above, the deal rooms 180 provide the buyer 15 with information regarding the sale of a particular product such as, for example, the price structure set up by the seller for the product, the quantity of products sold to date, the time remaining to purchase a product, etc. In order to allow a buyer to quickly find deal rooms 180 of interest, the processor 100 in step 245 provides the buyer 15 with a search screen 398 so that active deal rooms 180 of interest may be found. As shown in FIG. 8, in the present embodiment, the buyer 15 is provided with the ability to search based on a variety of different search criteria including "product type", "seller name", and "alphabetical index". Of course, various other manners for allowing a buyer 15 to select or find a deal room could alternatively be used.

Once a search is completed, the buyer 15 in step 250 is able to select a desired deal room 180 from the results obtained. For example, the buyer 15 may click on the name of a desired deal room (FIG. 8) using a mouse associated with the computer system 35. If the buyer 15 is unsatisfied with the search results or simply desires to re-perform the search, the buyer 15 at any time is able to return back to a previous screen selecting the "back" function available using an Internet browser such as, for example, Microsoft Internet Explorer, Netscape, etc. Additionally, a hyperlink to various screens, such as the search screen, preferably is provided on each web page.

Upon selecting a deal room 180, the processor 100 in step 255 displays a page of standard terms and conditions which the buyer 15 must agree to prior to entering the deal room. The terms and conditions relate to the terms governing the sale of the product according to which both the buyer and seller are willing to conduct business. If the terms and conditions are not accepted, the processor 100 returns the buyer 15 to step 245 so that another deal room 180 may be selected and/or another search may be performed. If, however, in step 260 the terms and conditions are accepted, the processor 100 proceeds to allow the buyer 15 to enter the selected deal room 180. Once within a deal room 15, the processor 100 operates in accordance with the procedures discussed below with respect to FIGS. 14*a*-14*b*, related to the purchase of a product by one or more buyers 15.

Figure 9:
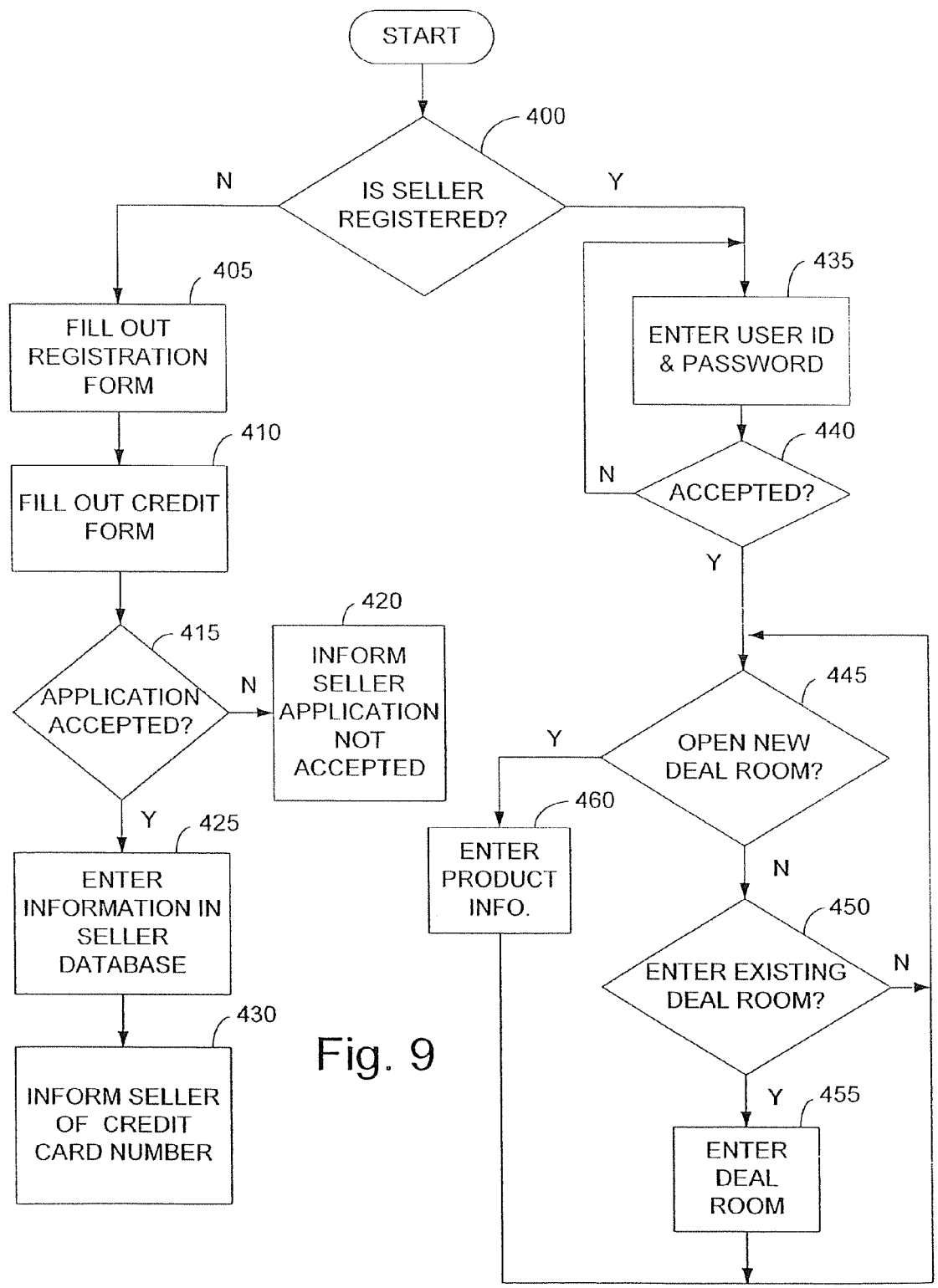
FIG. 9 illustrates a flow chart for a seller desiring to conduct business electronically in accordance with one aspect of the present invention.
Figure 10:
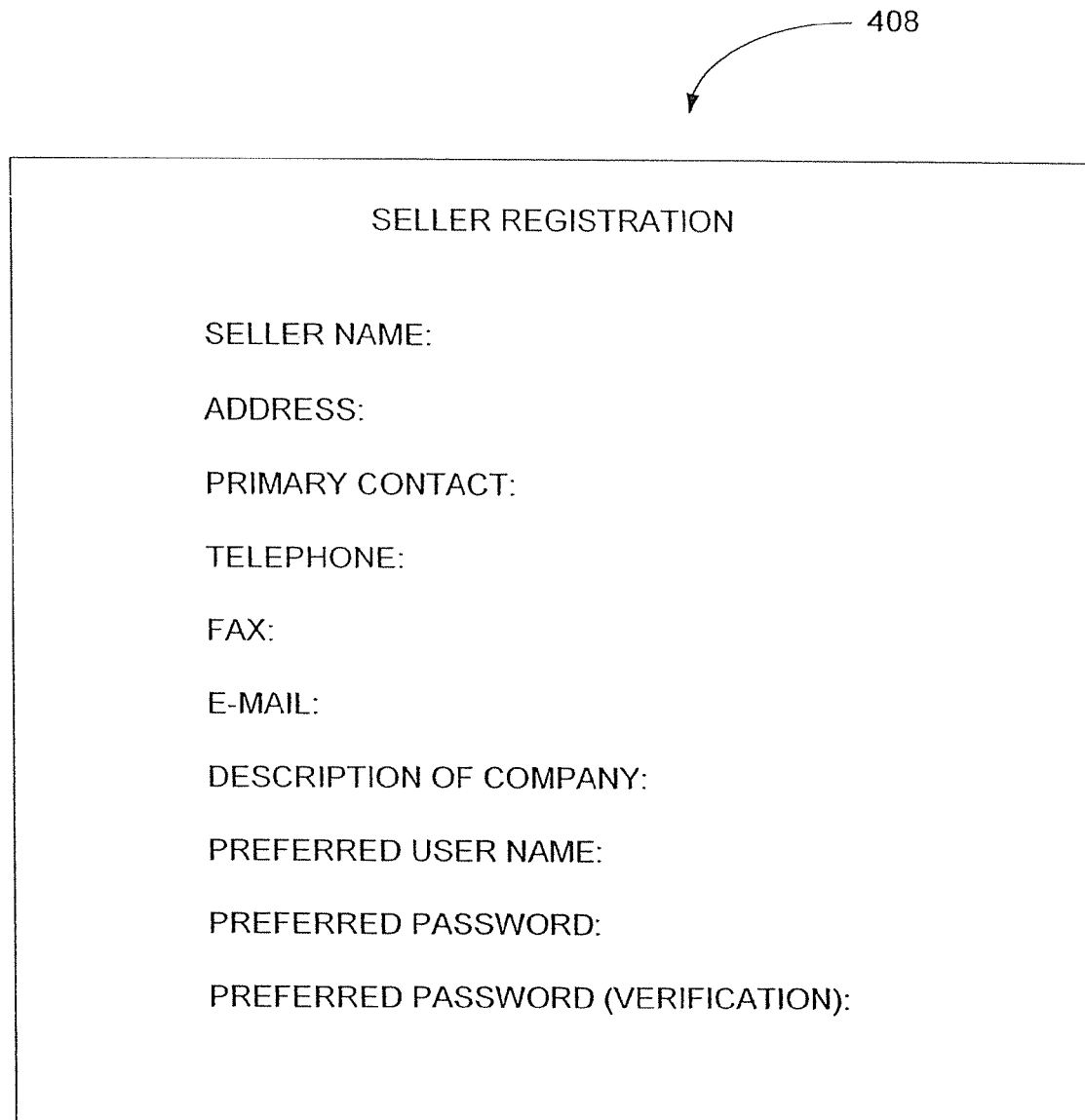
FIG. 10 illustrates an on-line registration form for a seller in accordance with one aspect of the present invention.

Proceeding now to FIG. 9, the operations of the processor 100 of the central server 25 in handling sellers 20 is depicted. In particular, the processor 100 in step 400 initially determines whether a seller 20 is registered or not based on which hyperlink 170, 175 (FIG. 3) the seller 20 selects. If the seller 20 selects hyperlink 175 indicating the seller is not registered, the processor 100 proceeds to step 405. In step 405, the processor 100 provides the seller 20 with a seller's registration form 408 (FIG. 10) to fill out. The registration form 408 is similar to the registration form 208 for the buyer 20 and allows the seller 20 to select a preferred user ID and password. Once completed, the processor 100 proceeds to step 410 where the seller 20 is requested to submit a credit card application so that all costs and fees associated with conducting business using deal rooms may be directly billed to the seller's credit card. As discussed above, the credit card approval process may occur by a third party vendor accessible via a hyperlink.

Once the credit card application is submitted by the seller 20, the processor 100 proceeds to step 415 where the processor 100 determines if the credit card application has been approved. If the credit card application has not been approved, the processor 100 proceeds to step 420 where the seller 20 is informed that their credit card application has not been approved and the seller 20 is provided with a customer service telephone number so that the seller 20 may optionally set up the account in a different fashion. If, however, in step 415 the credit card application is accepted, the processor 100 proceeds to step 425 where the seller information is stored in a seller database 427 (FIG. 11). Finally, in step 430, the processor 100 is configured to provide the seller 20 with the newly issued credit card number so that the seller 20 is able to open deal rooms. Further, the processor 100 is configured to provide a report to a system administrator who then mails a confirmation copy of the seller's information stored in the seller's database to the seller 20. This completes the seller's registration process.

Continuing to refer to FIG. 9, if in step 400 a seller has already registered, the seller 20 may login as a registered user by selecting the registered user hyperlink 170 (FIG. 3). Once selected, the processor 100, in step 435 prompts the seller 20 to enter their user ID and password. Upon input of the user ID and password, the processor 100 proceeds to step 440 where the processor 100 verifies a valid user ID and password have been entered by comparison with the information stored in the seller database 427 (FIG. 11). If the user ID and password entered by the seller 20 does not match any entry in the seller database 427, the processor 100 in step 440 returns to step 435 for re-entry of such information. If, however, in step 440, a valid user ID and password are entered, the processor 100 proceeds to step 445.

Figure 12:
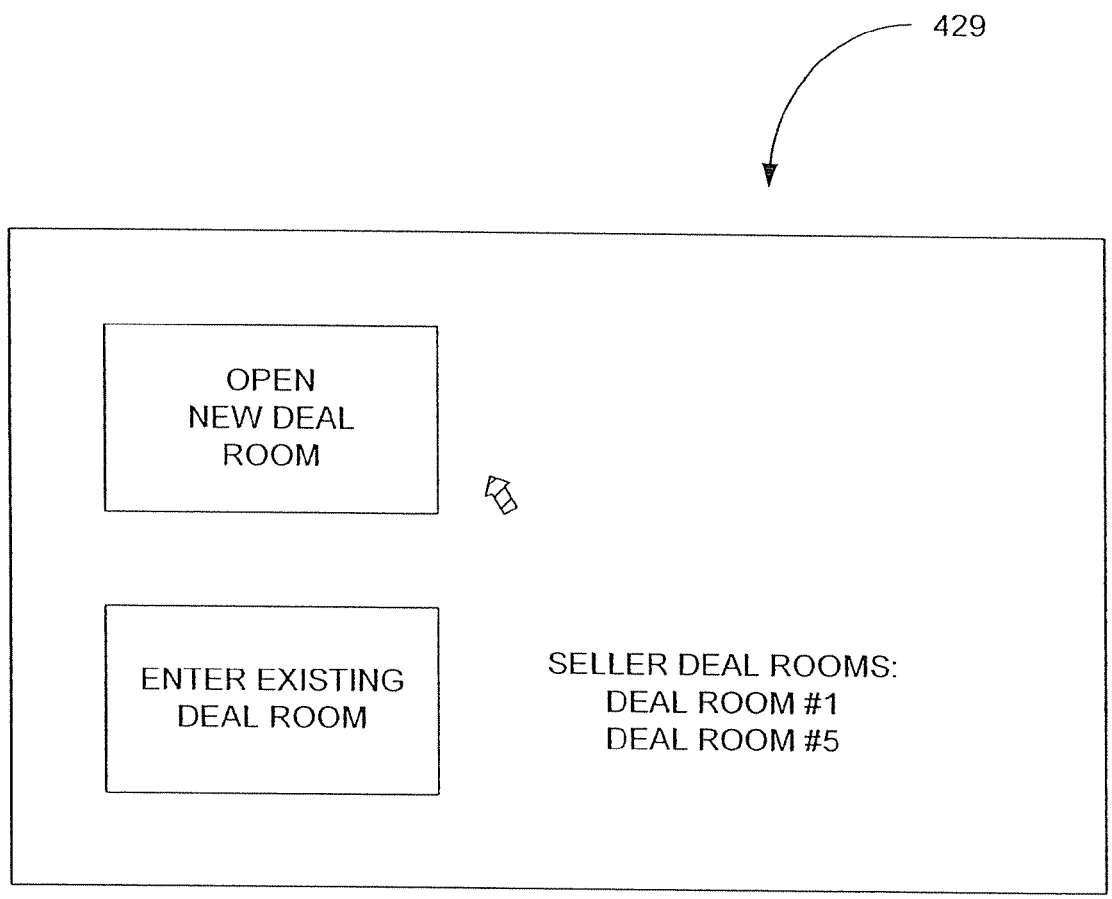
FIG. 12 illustrates a web page for a seller to open or visit a deal room in accordance with one aspect of the present invention.

Upon successful entry of a user ID and password, the seller 20 is provided with a seller option screen 429 as shown in FIG. 12. For example, the seller 20 may decide to open a new deal room 180 where a product may be placed for sale or the seller 20 may decide to view an current deal room 180 to determine the status of a given transaction. Accordingly, if in step 445, the processor 100 determines that the seller 20 desires to open a new deal room, the processor 100 proceeds to step 460.

In step 460, the processor 100 requests that the seller 20 enter the product information for the deal room they desire to open into a product information screen 433. For example, in the present embodiment the information requested is shown in FIG. 13 to include: product name and short description; minimum order quantity accepted; total quantity of products available; start time for offer; end time for offer; and a product pricing schedule. As discussed above, the processor 100 utilizes the information input from the seller 20 to display deal rooms 180 for viewing by registered buyers 15.

Continuing to refer to FIG. 9, if in step 445, the seller 20 has not selected to open a deal room, the processor 100 determines in step 450 whether the seller 20 has decided to enter an existing deal room 180. In the present embodiment of the invention, the seller 20 is limited to entering those deal rooms which they have opened. Accordingly, if the processor 100 determines that the seller does desire to enter a deal room 180, the processor 100 provides the seller 20 with a list of deal rooms 180 which the seller has opened. Upon selection of one of the deal rooms 180, the processor 100 proceeds to step 455 where the deal room 180 is displayed to the seller 20. If a deal room 180 is not entered in step 450, or following steps 455 and 460, the processor 100 returns to step 445.

Figure 14A:
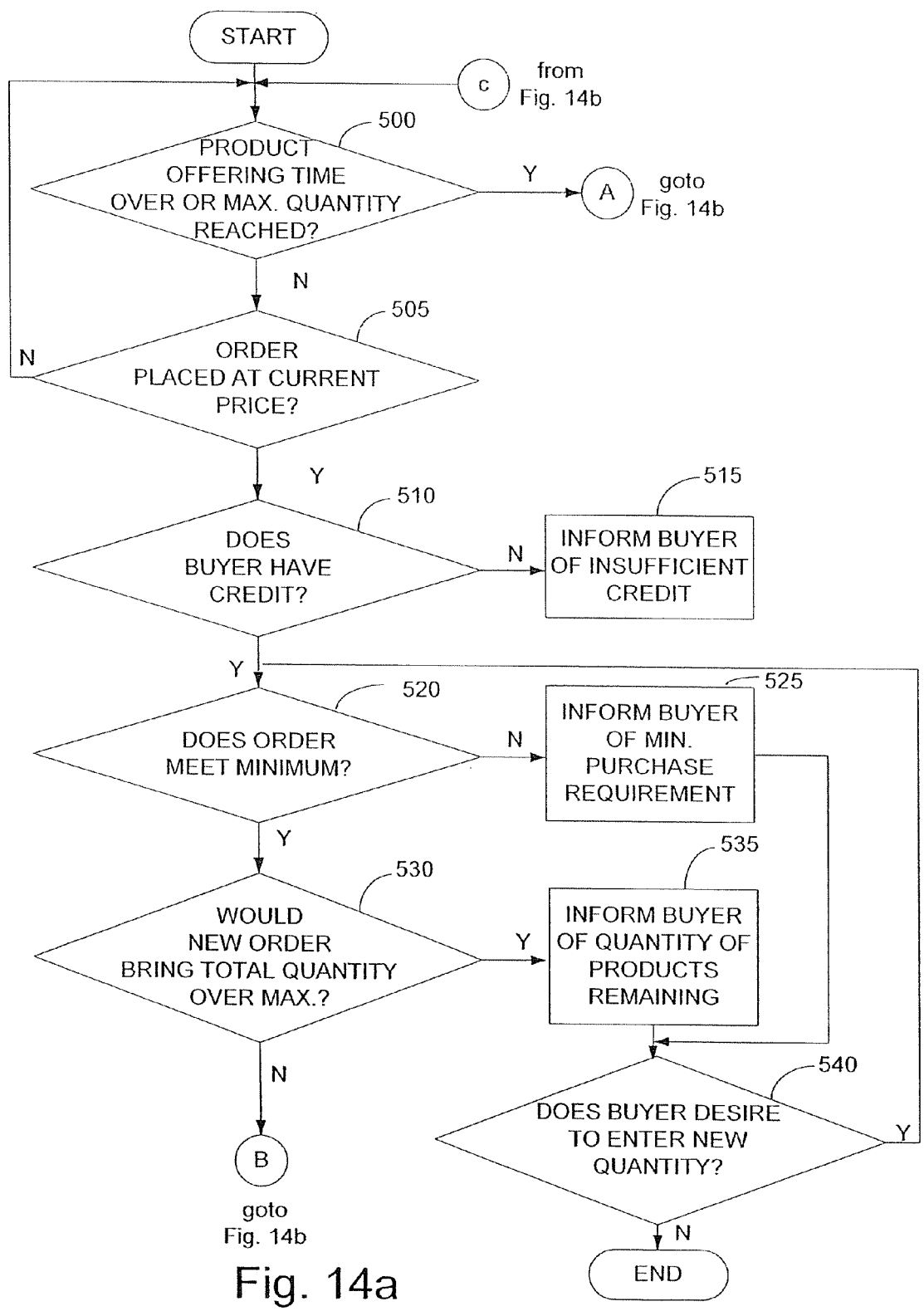
FIG. 14a-14b illustrate a flow chart for a volume costing methodology in accordance with one aspect of the present invention.
Figure 14B:
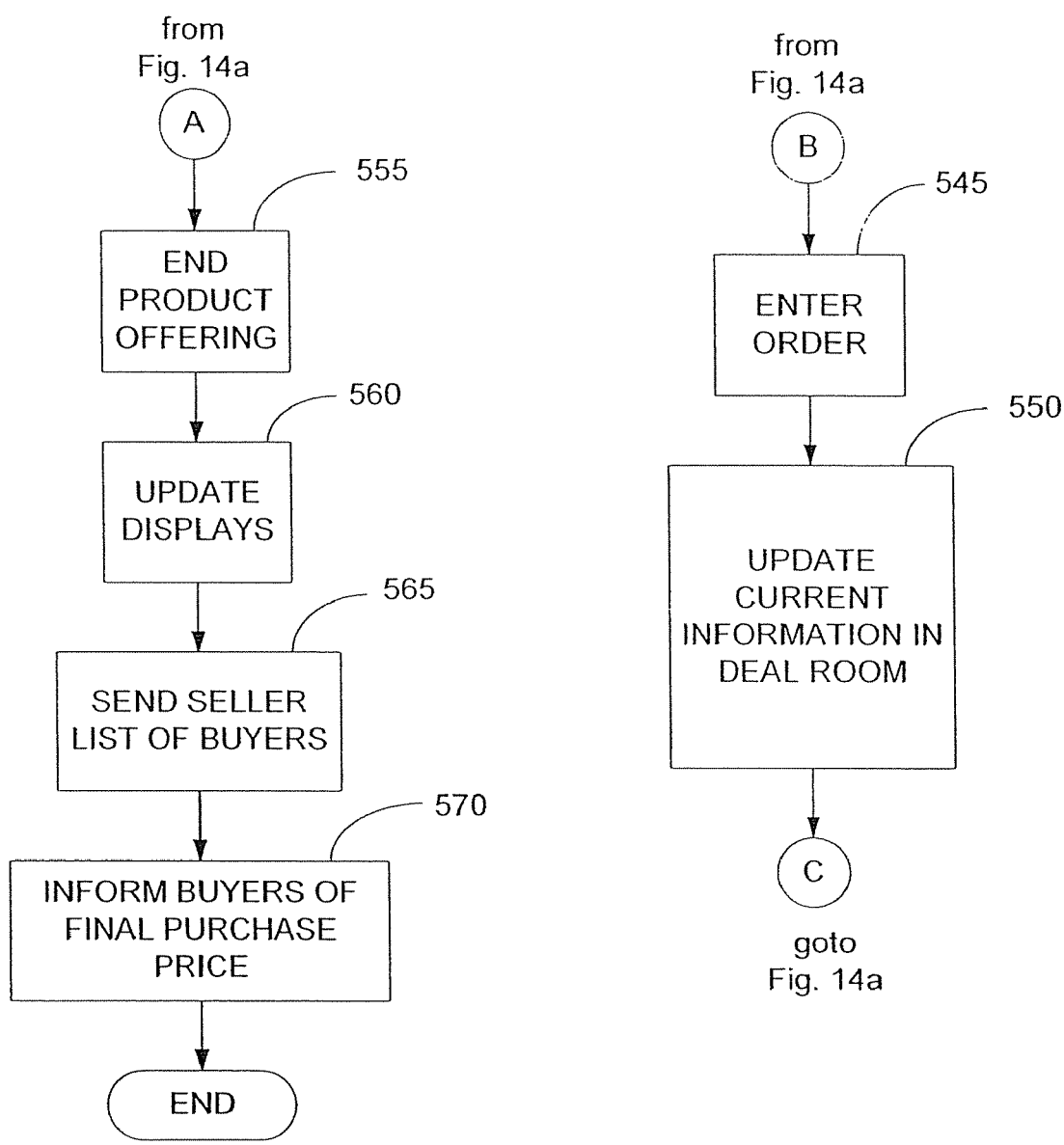

Turning now to FIGS. 14*a*-14*b*, a flow chart showing the operations of the processor 100 of the central server 25 for handling each deal room 180 opened by a seller 20 in accordance with one embodiment of the volume costing methodology is provided. Beginning at step 500, the processor 100 initially determines for a given deal room 180 whether an open session period has ended or a maximum quantity of products have been ordered. In determining whether an open session period has ended, the processor 100 compares the end time entered by the seller 20 in step 460 (FIG. 9) during set up of the deal room 180 with the current time. If the current time is later than the end time, the processor 100 concludes that the open session has ended. In order to determine if a maximum quantity of products have been ordered, the processor 100 compares the total quantity of products purchased to date with the maximum quantity of products available as entered by the seller 20. If the total quantity of products purchased to date is greater than the difference between the total quantity available minus the minimum purchase number (as also entered by the seller 20), the processor 100 concludes that the maximum quantity is reached. If in step 500, the processor 100 determines that the open session period has not ended and the maximum quantity has not been reached, the processor proceeds to step 505.

In step 505, the processor 100 determines if a new order has been placed at the current price. A new order is placed by, for example, a buyer 15 selecting the order icon 195 (FIG. 4) and entering a quantity of items to purchase along with their credit card number. If the processor 100 does not detect placement of a new order, the processor 100 returns to step 500. If, however, a new order is placed the processor 100 proceeds to step 510.

In step 510, the processor 100 determines if the buyer 15 has sufficient credit to cover the desired purchase quantity. In the present embodiment, in order to obtain credit approval, the processor 100 is configured to electronically send the credit card number entered by the buyer 15 along with the total purchase price to the credit agency in charge of the account. The credit card agency, in turn, transmits an electronic message indicating whether the buyer 15 has been approved or not. The manner in which the processor 100 interfaces with the credit agency to obtain approval for purchases is well known in the art and therefore further details related thereto have been omitted for sake of brevity. If the credit card agency informs the processor 100 that the transaction has not been approved, the processor 100 proceeds to step 515. In step 515, the processor 100 provides a message to the buyer 15 that the order has not been placed due to disapproval by the credit card agency and requests that the buyer 15 to check with the credit card agency for further information or call a posted customer information number.

If, however, in step 510 the credit card agency informs the processor 100 that the buyer's 15 credit has been approved, the processor 100 proceeds to step 520. In step 520 the processor 100 determines if the order placed by the buyer meets the minimum order quantity as set by the seller 20 in step 460 (FIG. 9) above. If the minimum order quantity has not been met, the processor 100 proceeds to step 525. In step 525, the processor 100 informs the buyer 15 that the minimum purchase requirement has not been met and requests the buyer 15 to enter a new order quantity if desired. If in step 530 the minimum purchase requirement has been met, the processor proceeds to step 530. In step 530 the processor 100 determines if the new order placed by the buyer 15 would bring the total quantity over the maximum quantity set by the seller in step 460 (FIG. 9) above. If the new order would bring the total quantity over the maximum quantity, the processor 100 proceeds to step 535 where the processor 100 informs the buyer 15 of the total products remaining for sale and requests the buyer 15 to enter a new order quantity if desired. Following steps 525 and 535, the processor 100 proceeds to step 540 where the processor 100 determines if the buyer has entered a new quantity. If a new quantity is not entered, the processor 100 ends the order processing for the buyer 15. If, however, a new order quantity is entered, the processor 100 returns to step 520.

Figure 15:
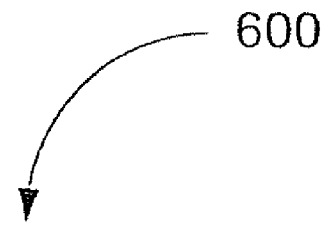
FIG. 15 illustrates an order database maintained by the central server for each deal room in accordance with one aspect of the present invention.

If in step 530, the processor 100 determines that the new order would not bring the total over the maximum set by the seller 20, the processor proceeds to step 545 (FIG. 14*b*). In step 545 the processor 100 enters the buyer's order by storing the buyer's name and quantity ordered in an order database 600 (FIG. 15) for the deal room. Each time a new buyer places an order for the product, the order database 600 is updated with the buyer name and order quantity information. Next, in step 550, the processor 100 updates all of the information displayed in the deal room 180 in view of the most recent order. For example, the processor 100 updates the total quantity of products purchased and the quantity remaining. Further, if the new order places the total quantity of products at a new price, the highlighted region 188 (FIG. 4) on the price schedule 186 is updated accordingly. Following step 550, the processor 100 returns to step 500 (FIG. 14*a*).

If in step 500 (FIG. 14*a*), the processor 100 determines that the product offering time has expired or that the maximum quantity of products have been ordered, the processor proceeds to step 555 (FIG. 14*b*). At step 555, the processor 100 ends the product offering by no longer accepting orders by new buyers 15. Next, in step 560 the processor 100 updates its displays to display the current status of the product being sold. For example, the total quantity purchased and current price may be updated if needed. Also, a conspicuous message is posted in the deal room 180 indicating to the buyers 15 that new orders are not being accepted due to either the open session period expiring or the product being sold-out.

Next, in step 565 the processor 100 electronically forwards the order database 600 for the deal room to the appropriate seller 15 along with a final price for the product. In this manner, the seller 15 is able to have a complete record of all of the orders which need to be filled. Finally, in step 570 the processor 100 electronically informs each of the buyers 15 listed in the order database 600 that the product offering has ended and reminding the buyer of the total quantity of products which the buyer 15 has committed to purchasing. Further, the processor 100 also informs the buyers 15 of the final price of the product as determined from the price schedule 186. Thereafter, the buyer and seller independently communicate with one another to complete order delivery and the like.

The invention has been described with reference to the preferred embodiments. Obviously, modifications and alterations will occur to others upon reading and understanding the preceding detailed description. It is intended that the invention be construed as including all such modifications alterations, and equivalents thereof and is limited only by the scope of the following claims.

What is claimed is:

1. A system that facilitates volume pricing, comprising:
at least one processor coupled to a memory that executes the following computer executable components:
a first component that generates a virtual forum configured to host a private deal room that displays an offer for an item for sale by a seller;
a second component that grants or forbids access to the private deal room, access is granted to a potential buyer who qualifies based at least in part on criteria chosen by the seller; and
a third component that determines a lowest price for the item.

2. The system of claim 1, access is granted to the potential buyer selected by the seller.

3. The system of claim 1, the criteria are terms and conditions.

4. The system of claim 1, the criteria must be accepted by the potential buyer.

5. The system of claim 1, the criteria must be met by the potential buyer.

6. The system of claim 1, the lowest price is based at least in part upon a price schedule that varies according to a total quantity ordered via the private deal room.

7. The system of claim 1, the offer includes at least one of a price schedule for the item, a current price level for the item, a total quantity of the item made available, a total quantity of the item purchased to date, or a total available quantity of the item remaining, which is displayed only in the private deal room.

8. The system of claim 1, the private deal room is configured to accept an order for the item from a buyer such that a bid for the item at a sale price displayed in the offer guarantees the order for the item at or below the sale price.

9. The system of claim 8, the seller sells the item to the buyer at a price equal to the lowest price, irrespective of a price associated with the order.

10. The system of claim 8, the buyer receives a line of credit in order to accept the offer.

11. The system of claim 1, the seller limits at least one of a maximum quantity available for the item and a maximum time during which the offer can be accepted.

12. The system of claim 1, the forum comprises a plurality of private deal rooms.

13. A method for facilitating volume pricing, comprising:
employing at least one processor to execute computer executable instructions stored in memory to perform the following acts:

selecting a set of buyers who qualify for access to a private deal room as a function of seller terms and conditions;

presenting an offer for a product or service to a buyer at a current price in the private deal room;

accepting a quantity of the product or service by the buyer;

aggregating a total quantity ordered via the deal room; and updating a price point based at least in part upon the total quantity ordered.

14. The method of claim 13, further comprising limiting the set of buyers to buyers selected by a seller of the product or service.

15. The method of claim 13, further comprising limiting the set of buyers to buyers that accept or agree to a seller's terms and conditions.

16. The method of claim 13, further comprising limiting the set of buyers to buyers that meet or satisfy a seller's terms and conditions.

17. The method of claim 13, further comprising filling all orders at a final updated price point.

18. A method for facilitating volume pricing, comprising:

employing at least one processor to execute computer executable instructions stored in memory to perform the following acts:

displaying an offer for an item at a specified price in a private electronic forum;

limiting access to the forum to participants satisfying a seller's terms and conditions;

receiving an order for the item from at least one participant;

reducing the specified price when an amount of the item ordered exceeds a threshold; and agreeing to fill all orders at the lowest specified price.

19. The system of claim 12, each of the plurality of private deal rooms includes a different price schedule for the item.

20. The method of claim 13, updating the price point as a function of a price schedule associated with the deal room.

* * * * *